United States Patent
Yuasa et al.

(10) Patent No.: US 12,053,922 B2
(45) Date of Patent: Aug. 6, 2024

(54) GRANULAR MATERIAL FOR HEAT-FUSION TYPE THREE-DIMENSIONAL PRINTERS, METHOD FOR MANUFACTURING MOLDED OBJECT, LAYERED STRUCTURE, AND METHOD FOR MANUFACTURING LAYERED STRUCTURE

(71) Applicant: KYORAKU CO., LTD., Kyoto (JP)

(72) Inventors: Ryohei Yuasa, Yamato (JP); Takashi Nomura, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 391 days.

(21) Appl. No.: 17/425,082

(22) PCT Filed: Feb. 4, 2020

(86) PCT No.: PCT/JP2020/004044
§ 371 (c)(1),
(2) Date: Jul. 22, 2021

(87) PCT Pub. No.: WO2020/162427
PCT Pub. Date: Aug. 13, 2020

(65) Prior Publication Data
US 2022/0105675 A1     Apr. 7, 2022

(30) Foreign Application Priority Data

Feb. 7, 2019 (JP) ................. 2019-020542
Mar. 15, 2019 (JP) ................. 2019-048442

(51) Int. Cl.
*B29C 64/118* (2017.01)
*B33Y 10/00* (2015.01)
(Continued)

(52) U.S. Cl.
CPC ............ *B29C 64/118* (2017.08); *B33Y 10/00* (2014.12); *B33Y 70/00* (2014.12); *B29K 2021/003* (2013.01)

(58) Field of Classification Search
CPC ....... B29C 64/118; B33Y 10/00; B33Y 70/00; B29K 2021/103
(Continued)

(56) References Cited

U.S. PATENT DOCUMENTS

2007/0003656 A1  1/2007  Labossiere et al.
2014/0272270 A1  9/2014  Hansen
(Continued)

FOREIGN PATENT DOCUMENTS

EP  3012078 A1  4/2016
EP  3067389 A1  9/2016
(Continued)

OTHER PUBLICATIONS

English translation of JP2017177497 (Year: 2017).*
(Continued)

*Primary Examiner* — Jeffrey M Wollschlager
*Assistant Examiner* — Xue H Liu
(74) *Attorney, Agent, or Firm* — Maier & Maier, PLLC

(57) ABSTRACT

The present invention provides a granular material for a fused deposition three-dimensional printer that enables a flexible molded object to be manufactured with high precision. According to the present invention, provided is a granular material for a fused deposition three-dimensional printer. The granular material is formed of a thermoplastic elastomer, and thermoplastic elastomer has a Shore A hardness of 0 to 10 and a melt flow rate of 10 to 200 g/10 min at least one of measurement temperatures of 120 to 230° C.

3 Claims, 14 Drawing Sheets

(51) Int. Cl.
  *B33Y 70/00* (2020.01)
  *B29K 21/00* (2006.01)
(58) Field of Classification Search
  USPC .......................................................... 264/308
  See application file for complete search history.

(56) References Cited

U.S. PATENT DOCUMENTS

| | | |
|---|---|---|
| 2016/0374428 A1 | 12/2016 | Kormann et al. |
| 2017/0144407 A1 | 5/2017 | Hansen |
| 2018/0111313 A1 | 4/2018 | Murao et al. |
| 2018/0271211 A1 | 9/2018 | Perrault et al. |
| 2018/0271213 A1 | 9/2018 | Perrault et al. |
| 2019/0010311 A1 | 1/2019 | Yoshinaga et al. |
| 2019/0152188 A1 | 5/2019 | Hansen |
| 2021/0321716 A1 | 10/2021 | Kormann et al. |

FOREIGN PATENT DOCUMENTS

| | | |
|---|---|---|
| EP | 3287264 A1 | 2/2018 |
| JP | 2009-500194 A | 1/2009 |
| JP | 2012-017392 A | 1/2012 |
| JP | 2014-033966 A | 2/2014 |
| JP | 2016-036433 A | 3/2016 |
| JP | 2016511337 A | 4/2016 |
| JP | 2017-012751 A | 1/2017 |
| JP | 2017-177497 A | 10/2017 |
| JP | 2018-051917 A | 4/2018 |
| JP | 2018-086829 A | 6/2018 |
| JP | 2018-187363 A | 11/2018 |
| WO | 2017/154335 A1 | 9/2017 |
| WO | 2018/207242 A1 | 11/2018 |

OTHER PUBLICATIONS

Extended European Search Report issued on Jun. 13, 2022 in corresponding European Patent Application No. 20751936.4; 19 pgs.
Xiaoyong Tian et al., "Interface and performance of 3D printed continuous carbon fiber reinforced PLA composites", Composites Part A, Elsevier, Amsterdam, NL, vol. 88, Jun. 2, 2016, pp. 198-205.
Omar Ahmed Mohamed et al., "Analytical Modelling and Optimization of the Temperature-Dependent Dynamic Mechanical Properties of Fused Deposition Fabricated Parts Made of PC-ABS", Materials, vol. 9, 895, Nov. 4, 2016, 19 pages.
Office Action issued on Aug. 16, 2022 in corresponding Japanese Patent Application No. 2019-020542; 6 pages.
Office Action issued on Feb. 14, 2023, in corresponding Japanese Application No. 2019-020542, 8 pages.
International Search Report issued on Apr. 28, 2020 in corresponding International Application No. PCT/JP2020/004044; 7 pages.
Partial Supplementary European Search Report issued on Feb. 25, 2022 in corresponding European Application No. 20751936.4; 28 pgs.

\* cited by examiner

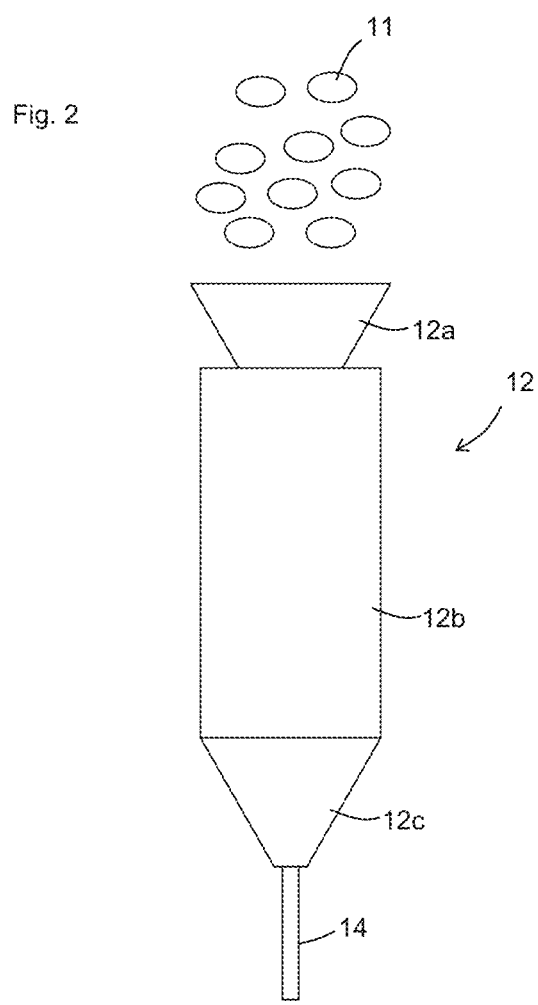

GRANULAR MATERIAL FOR HEAT-FUSION TYPE THREE-DIMENSIONAL PRINTERS, METHOD FOR MANUFACTURING MOLDED OBJECT, LAYERED STRUCTURE, AND METHOD FOR MANUFACTURING LAYERED STRUCTURE

TECHNICAL FIELD

The present invention relates to a granular material for a fused deposition three-dimensional printer, a manufacturing method of a molded object using the granular material, a laminated structure, and a manufacturing method of the laminated structure.

BACKGROUND ART (First Viewpoint)

Patent Literature 1 discloses a method for forming a molded object by supplying a filament as a molding material to an extrusion head, melting the filament in a liquefier mounted on the extrusion head, and extruding the molten filament onto a base through a nozzle.

In such a method, the filament is generally fed directly to a distal end of the nozzle by meshing of a gear or the like. In this regard, if the filament is formed of a highly flexible thermoplastic elastomer, the gear may not engage with the filament and the filament may not be supplied to the distal end of the nozzle.

In Patent Literature 2, the above problem is solved by using a filament in which a linear reinforcing portion is provided on a part of the outer peripheral surface of a core material portion containing a thermoplastic elastomer.

(Second Viewpoint)

In recent years, a three-dimensional lamination molding apparatus, so-called a 3D printer, has become widespread, and a three-dimensional laminated structure made of resin, as well as metal and inorganic materials, has been widely in practical use. As a 3D printer for resin, the material extrusion deposition method in which thermoplastic resin, such as ABS (Acrylonitrile Butadiene Styrene) resin or PLA (Polylactic Acid) resin, is extruded from a nozzle is widely used. Other known methods include the powder sintering lamination molding method, material jetting, and the optical molding method.

In some applications of the three-dimensional laminated structure made of resin, flexibility is required. Examples of such applications include shoe insoles. Under such circumstances, a rubber molded body manufactured by the three-dimensional lamination molding method is proposed in Patent Literature 3. In Patent Literature 3, a step of curing rubber after lamination is performed, and a lattice-shaped structure formed by combining planar structures is proposed.

CITATION LIST

Patent Literature

Patent Literature 1: JP-A-2009-500194

Patent Literature 2: JP-A-2017-177497

Patent Literature 3: WO-A-2017/154335

SUMMARY OF INVENTION

Technical Problem (First Viewpoint)

However, the linear reinforcing portion is molded together in the method of Patent Literature 2. Therefore, in order to obtain a molded object formed of only an elastomer, it is necessary to dissolve the linear reinforcing portion with water or organic solvent after molding by the three-dimensional printer. Such a process is troublesome and may also degrade the quality of the molded object.

Further, when the thermoplastic elastomer is used, the distance between line portions forming the molded object may be widened to particularly increase the flexibility of the molded object. However, the shape of the molded object tends to collapse, depending on the material used, which makes it very difficult to perform molding with high precision.

The present invention has been made in view of such circumstances and provides a granular material for a fused deposition three-dimensional printer that enables a flexible molded object to be manufactured with high precision.

(Second Viewpoint)

Further, the rubber composition described in Patent Literature 3 does not have thermoplasticity and requires a curing step after lamination. In addition, the configuration in which the planar structures are combined has a problem that adjustable range of the flexibility for the entire structure is narrow.

The present invention has been made in view of such circumstances and provides a more flexible laminated structure and a manufacturing method of the laminated structure for a three-dimensional laminated structure made of resin.

Solution to Problem (First Viewpoint)

According to the present invention, provided is a granular material for a fused deposition three-dimensional printer, wherein the granular material is formed of a thermoplastic elastomer, and the thermoplastic elastomer has a Shore A hardness of 0 to 10 and a melt flow rate of 10 to 200 g/10 min at least one of measurement temperatures of 120 to 230° C.

The first feature of the present invention is that the material is not filament but a granular material. The granular material of the present invention can be melted using an extruder with a screw and extruded from a nozzle, so that there is no need to use the linear reinforcing portion used in Patent Literature 2, and there is no need for the step of dissolving the linear reinforcing portion from the molded object.

The second feature of the present invention is that the thermoplastic elastomer has a specific Shore A hardness and melt flow rate. When the thermoplastic elastomer having the Shore A hardness and melt flow rate in the range defined in the present invention is used, a flexible molded object can be manufactured with high precision by adjusting molding temperature.

Hereinafter, various embodiments of the present invention will be exemplified. The embodiments shown hereinafter can be combined with each other.

Preferably, in the afore-mentioned granular material, the melt flow rate is 60 to 140 g/10 min at least one of the measurement temperatures of 120 to 230° C.

Preferably, provided is a manufacturing method of a molded object, comprising a scanning step of scanning a strand formed by extruding, from a nozzle, the afore-mentioned granular material melted in an extruder with a screw.

Preferably, in the afore-mentioned method, a melt flow rate of the strand at a molding temperature is 10 to 200 g/10 min, and the molding temperature is a temperature of the strand immediately after being extruded from the nozzle.

Preferably, in the afore-mentioned method, the melt flow rate of the strand at the molding temperature is 60 to 140 g/10 min.

Preferably, in the afore-mentioned method, a laminated structure is formed by laminating single-layer structures formed by performing the scanning step, the single-layer structures each comprise a plurality of parallel line portions spaced apart from each other, and two single-layer structures adjacent to each other in a vertical direction are provided so that pluralities of parallel line portions of the two single-layer structures intersect with each other.

Preferably, in the afore-mentioned method, a pitch ratio defined as a ratio of a pitch of the parallel line portions to a line width of the parallel line portions is 1.5 to 6.

(Second Viewpoint)

According to the present invention, provided is a laminated structure formed by laminating a plurality of layers, wherein each of the layers comprises a plurality of linear resins arranged in parallel, and a condition of d>t is satisfied where d represents a distance between two adjacent linear resins in a same layer, and t represents a thickness of the linear resins in a lamination direction.

In the structure of the present invention, the distance between the linear resins in the same layer is set wide. Therefore, even if a three-dimensional material extrusion deposition apparatus that is widely used as a 3D printer and the thermoplastic resin applied to the three-dimensional material extrusion deposition apparatus are used, it is possible to form a three-dimensional laminated structure with high flexibility.

BRIEF DESCRIPTION OF DRAWINGS

FIG. 2 is an explanatory diagram showing the state where a granular material 11 is fed into an extruder 12 of a fused deposition three-dimensional printer available in the present invention to form a strand 14.

FIG. 3A is a perspective view, and FIG. 3B is a plan view.

FIG. 4A is a perspective view, and FIG. 4B is a plan view.

FIG. 5A is a perspective view, and FIG. 5B is a plan view.

FIG. 6A is a perspective view, and FIG. 6B is a plan view.

DESCRIPTION OF EMBODIMENTS

Hereinafter, embodiments of the present invention will be described. Various characteristics described in the following embodiments can be combined with each other. Further, the invention is independently established for each characteristic.

(First Viewpoint)

1. Granular Material for Heat-Fusion Type Three-Dimensional Printer

Figure 1A:
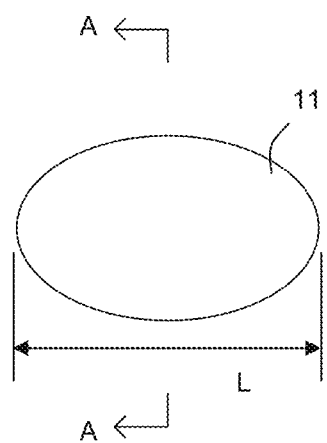
FIG. 1A shows an example of the shape of a granular material of an embodiment of the first viewpoint of the present invention.
Figure 1B:
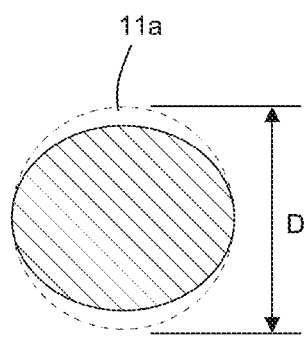
FIG. 1B is a cross-sectional view taken along A-A line in FIG. 1A.

A granular material 11 for a fused deposition three-dimensional printer of an embodiment of the present invention shown in FIG. 1A and FIG. 1B is formed of a thermoplastic elastomer. This thermoplastic elastomer has a Shore A hardness of 0 to 10 and a melt flow rate of 10 to 200 g/10 min at least one of the measurement temperatures of 120 to 230° C. The details will be described below.

The granular material 11 of the present embodiment is not in the form of thread, such a filament, but in a granular form that can be easily fed into an extruder with a screw. As shown in FIG. 1A and FIG. 1B, L/D is, for example, 1 to 10 and preferably 1 to 5 where L represents the length of the longest part of a grain constituting the granular material, and D represents the diameter of the largest circumscribed circle 11a in a plane perpendicular to the longest part. L is, for example, 0.5 to 10 mm, preferably 1 to 6 mm, and more preferably 2 to 4 mm L/D is specifically, for example, 1, 2, 3, 4, 5, 6, 7, 8, 9, 10 and may be within a range between any two of the values exemplified herein. L is specifically, for example, 0.5, 1, 2, 3, 4, 5, 6, 7, 8, 9, 10 mm and may be within a range between any two of the values exemplified herein.

Examples of the thermoplastic elastomer forming the granular material 11 include styrenic elastomers, olefinic elastomers, and acrylic elastomers. This thermoplastic elastomer preferably contains a styrenic elastomer. Since the styrenic elastomer has high flexibility, the flexibility of the thermoplastic elastomer increases when the thermoplastic elastomer contains the styrenic elastomer. The percentage of the styrenic elastomer in the thermoplastic elastomer is preferably 50 to 100% by mass, more preferably 80 to 100% by mass, specifically, for example, 50, 60, 70, 80, 90, 100% by mass and may be within a range between any two of the values exemplified herein.

The styrenic elastomer is a thermoplastic elastomer containing a styrene unit, and examples include one of or a blend of two or more of styrenic copolymers (e.g., styrene-ethylene-styrene block copolymer (SES), styrene-butadiene-styrene block copolymer (SBS), styrene-isoprene-styrene block copolymer (SIS), styrene-butadiene rubber (SBR), and the like) and hydrogenated styrenic copolymers (e.g., styrene-ethylene-propylene-styrene block copolymer (SEPS), styrene-ethylene-butylene-styrene block copolymer (SEBS) styrene-butylene-butadiene-styrene block copolymer (SBBS), hydrogenated styrene-butadiene rubber (HSBR), and the like).

The Shore A hardness of the thermoplastic elastomer is 0 to 10, specifically, for example, 0, 1, 2, 3, 4, 5, 6, 7, 8, 9, 10 and may be within a range between any two of the values exemplified herein. When the Shore A hardness is within this range, a molded object with excellent flexibility can be obtained. The Shore A hardness is measured in accordance with JIS K6253.

The melt flow rate of the thermoplastic elastomer (hereinafter referred to as "MFR") is 10 to 200 g/10 min at least one of the measurement temperatures of 120 to 230° C. The MFR is measured in accordance with JIS K-7210 at a test load of 2.16 kg.

As will be described later, when the MFR at the molding temperature is 10 to 200 g/10 min, the molded object can be manufactured with high precision by the fused deposition three-dimensional printer even if the distance between line portions constituting the molded object is relatively large. Further, the molding temperature in the fused deposition three-dimensional printer is usually 120 to 230° C. Therefore, if the MFR of the thermoplastic elastomer satisfies the above condition, the molded object can be manufactured with high precision by appropriately adjusting the molding temperature.

Further, since the molded object can be manufactured with particularly high precision when the MFR at the molding temperature is 60 to 140 g/10 min, it is preferable that the MFR of the thermoplastic elastomer is 60 to 140 g/10 min at least one of the measurement temperatures of 120 to 230° C.

The above-mentioned measurement temperature is specifically, for example, 120, 130, 140, 150, 160, 170, 180, 190, 200, 210, 220, 230° C. and may be within a range between any two of the values exemplified herein. The above-mentioned MFR is specifically, for example, 10, 20, 30, 40, 50, 60, 70, 80, 90, 100, 110, 120, 130, 140, 150, 160, 170, 180, 190, 200 g/10 min and may be within a range between any two of the values exemplified herein.

The temperature range where the MFR is within the above-mentioned range is preferably 10° C. or higher and more preferably 20° C. or higher. In such a case, the setting of the molding temperature can be facilitated. This temperature range is, for example, 10 to 50° C., specifically, for example, 10, 15, 20, 25, 30, 35, 40, 45, 50° C. and may be within a range between any two of the values exemplified herein.

2. Manufacturing Method of Molded Object

As shown in FIG. 2, a manufacturing method of the molded object according to an embodiment of the present invention includes a scanning step of scanning a strand 14 formed by melting the granular material 11 described above in an extruder 12 with a screw and extruding it from a nozzle 12c. The strand 14 is extruded and scanned in a molten state The extruder 12 includes a hopper 12a, a cylinder 12b, and the nozzle 12c. The granular material 11 is fed into the cylinder 12b from the hopper 12a and is heated in the cylinder 12b and melted to become molten material. This molten material is conveyed toward a distal end of the cylinder 12b by the rotation of a screw arranged in the cylinder 12b and is extruded from the nozzle 12c provided at the distal end of the cylinder 12b to become the strand 14. With such a method, the strand 14 can be easily formed even when a highly flexible material, such as thermoplastic elastomer, is used.

The strand 14 has a linear shape, and its diameter is, for example, 0.5 to 6.0 mm and preferably 1.0 to 4.0 mm. This diameter is specifically, for example, 0.5, 1.0, 1.5, 2.0, 2.5, 3.0, 3.5, 4.0, 4.5, 5.0, 5.5, 6.0 mm and may be within a range between any two of the values exemplified herein.

The molded object can be manufactured by scanning the strand 14 so as to form the desired molded object and cooling and solidifying the scanned strand 14. The cooling may be natural cooling or forced cooling.

The molding temperature is defined as the temperature of the strand 14 immediately after being extruded from the nozzle 12c. The molding temperature is preferably 120 to 230° C. This is because, within such a range, the strand 14 can be sufficiently solidified during cooling, and the deterioration of molding material due to heating is less likely to occur. The MFR of the strand 14 at the molding temperature is preferably 10 to 200 g/10 min and more preferably 60 to 140 g/10 min. As will be shown in Examples described later, molding precision is particularly high when the MFR at the molding temperature is within this range.

The above-mentioned molding temperature is specifically, for example, 120, 130, 140, 150, 160, 170, 180, 190, 200, 210, 220, 230° C. and may be within a range between any two of the values exemplified herein. The above-mentioned MFR is specifically, for example, 10, 20, 30, 40, 50, 60, 70, 80, 90, 100, 110, 120, 130, 140, 150, 160, 170, 180, 190, 200 g/10 min and may be within a range between any two of the values exemplified herein.

Figure 3A:
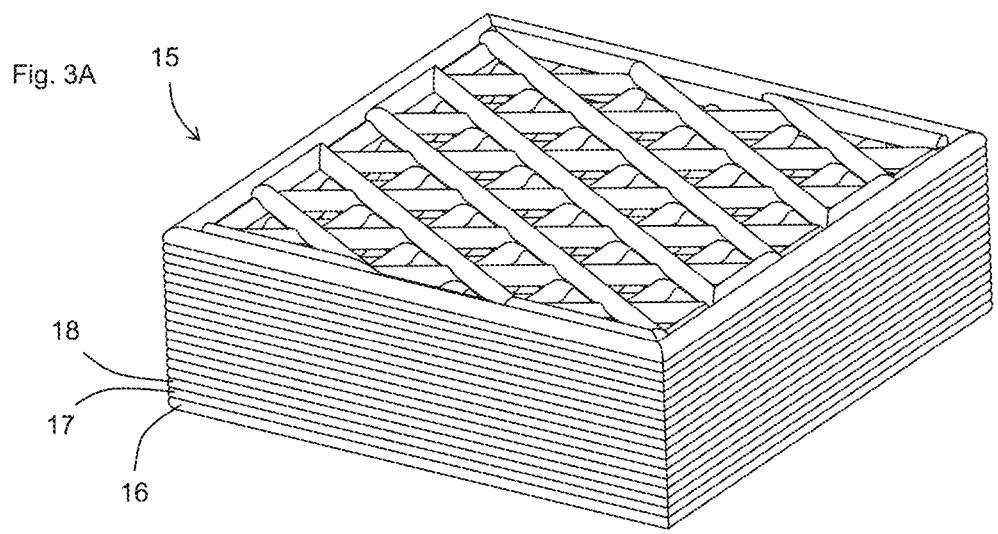
FIG. 3A and FIG. 3B show a laminated structure 15 in a reticulated shape.
Figure 3B:
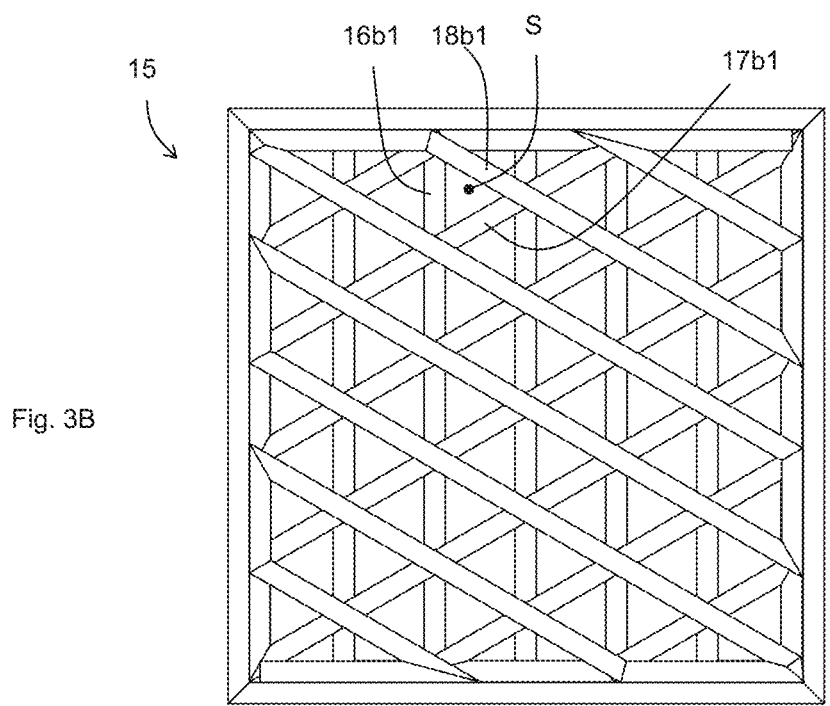

FIG. 3A and FIG. 3B show a molded object composed of a laminated structure 15 in a reticulated shape (in a mesh shape). The laminated structure 15 is formed by laminating single-layer structures 16, 17, 18 formed by the above-mentioned scanning step.

Figure 4A:
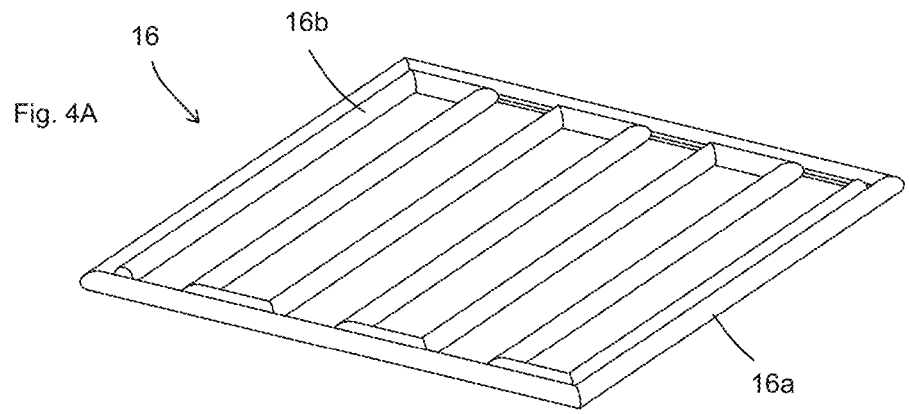
FIG. 4A and FIG. 4B show a single-layer structure 16.
Figure 4B:
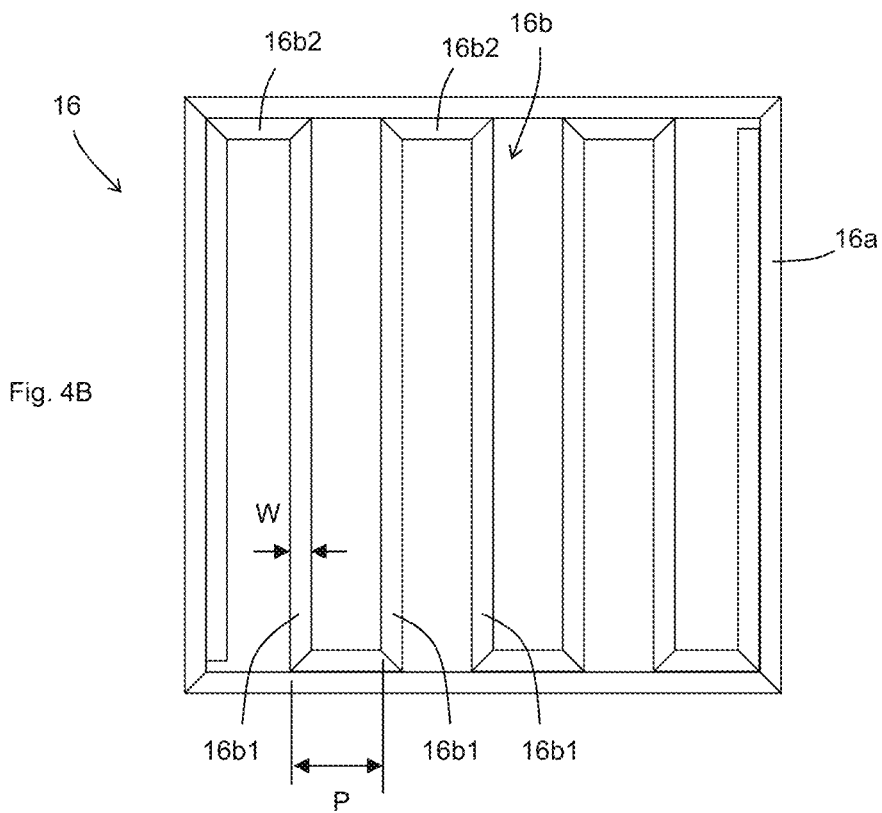

The single-layer structure 16 shown in FIG. 4A and FIG. 4B includes an outer circumferential line portion 16a and an inner line portion 16b. The outer circumferential line portion 16a and the inner line portion 16b are each formed by cooling the strand 14, and their line width is approximately equal to the diameter of the strand 14. The inner line portion 16b is provided within a region surrounded by the outer circumferential line portion 16a. The outer circumferential line portion 16a and the inner line portion 16b are welded to each other. It is preferable to form the outer circumferential line portion 16a and the inner line portion 16b respectively by a single stroke so as not to stop the extrusion the strand 14, and it is more preferable to form the entire single-layer structure 16 by a single stroke. In such a case, the number of times the extrusion of the strand 14 is stopped is reduced, which improves the modeling precision and productivity.

The inner line portion 16b includes a plurality of parallel line portions 16b1 spaced apart from each other and connecting line portions 16b2 each connecting the adjacent parallel line portions 16b1. As shown in FIG. 4B, the pitch ratio, which is the ratio of a pitch P of the parallel line portions 16b1 to the line width W of the parallel line portions 16b1, is preferably 1.5 to 6 and more preferably 2.0 to 5.0. If the pitch ratio is too small, the flexibility of the molded object may be insufficient, and if the pitch ratio is too large, modeling may be difficult. The pitch ratio is specifically, for example, 1.5, 2.0, 2.5, 3.0, 3.5, 4.0, 4.5, 5.0, 5.5, 6.0 and may be within a range between any two of the values exemplified herein.

Figure 5A:
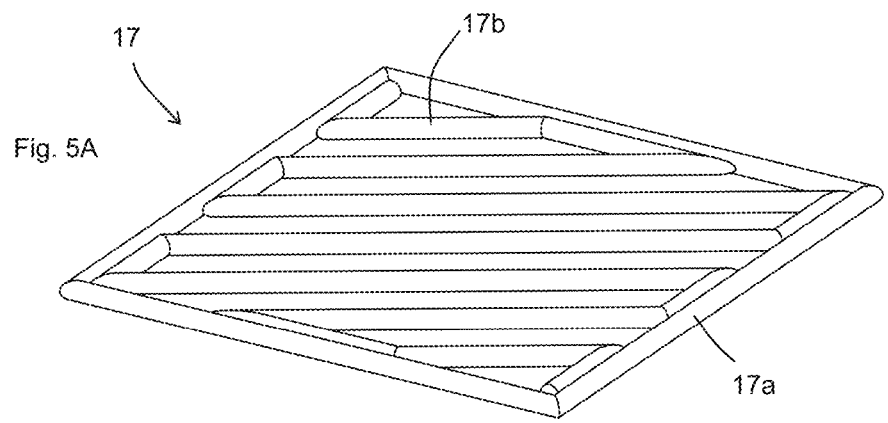
FIG. 5A and FIG. 5B show a single-layer structure 17.
Figure 5B:
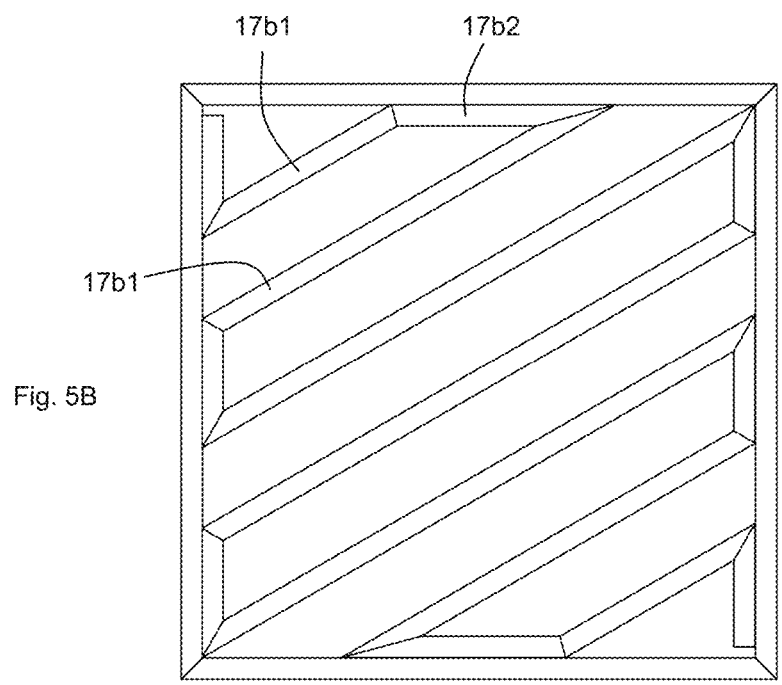

The single-layer structure 17 shown in FIG. 5A and FIG. 5B includes an outer circumferential line portion 17a and an inner line portion 17b. The inner line portion 17b includes a plurality of parallel line portions 17b1 and connecting line portions 17b2. The single-layer structure 17 has the same configuration as the single-layer structure 16 except that the direction in which the parallel line portions 17b1 extend is different from that of the parallel line portions 16b1. The parallel line portions 17b1 are formed to intersect with the plurality of parallel line portions 16b1. The larger the above-mentioned pitch ratio, the larger the distance (bridging distance) over which the parallel line portion 17b1 cross the two parallel line portions 16b1, and the more likely the parallel line portion 17b1 will be deflected, resulting in a decrease in molding precision. In the present embodiment, the MFR at the molding temperature is set within the above range to suppress the deterioration of the molding precision due to the deflection of the parallel line portion.

Figure 6A:
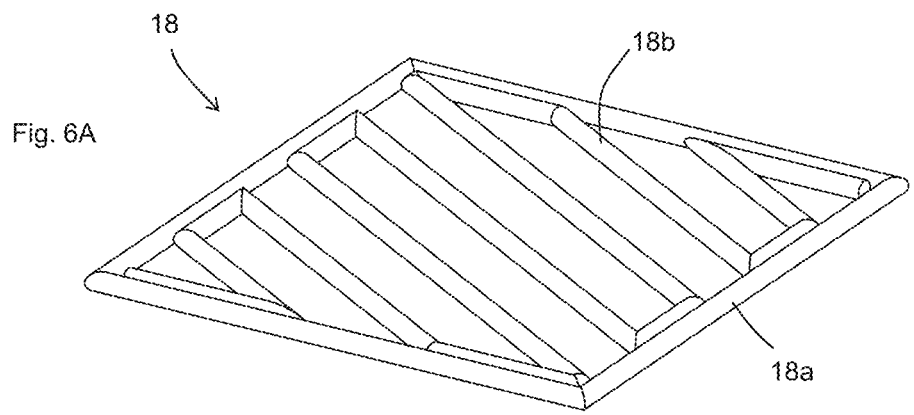
FIG. 6A and FIG. 6B show a single-layer structure 18.
Figure 6B:
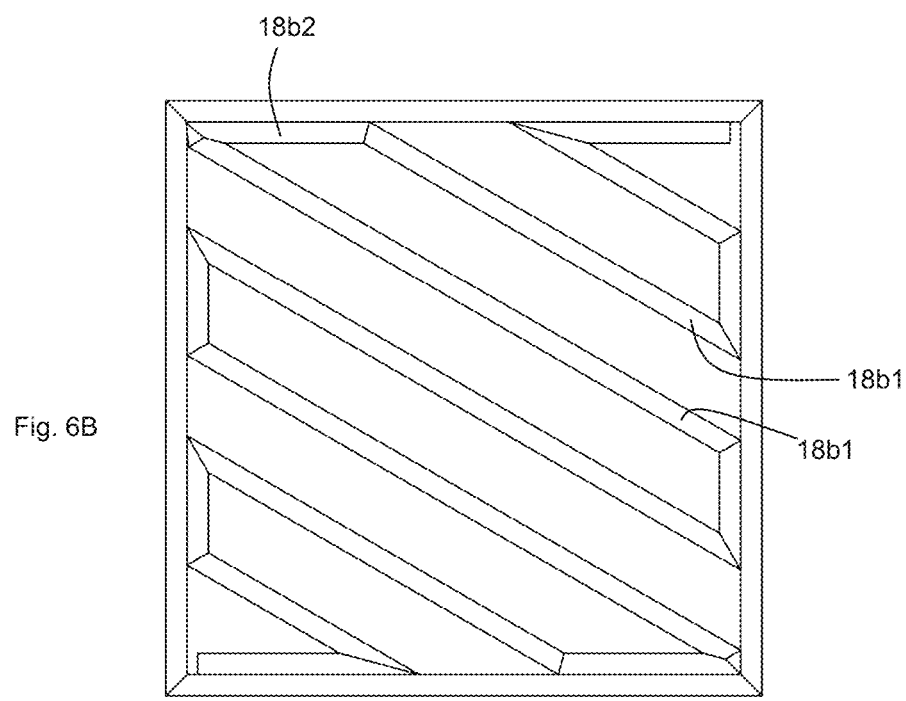

The single-layer structure 18 shown in FIG. 6A and FIG. 6B includes an outer circumferential line portion 18a and an inner line portion 18b. The inner line portion 18b includes a plurality of parallel line portions 18b1 and connecting line portions 18b2. The single-layer structure 18 has the same configuration as the single-layer structure 16 except that the direction in which the parallel line portions 18b1 extend is different from that of the parallel line portions 16b1.

The laminated structure 15 is formed by repeatedly laminating the single-layer structures 16, 17, 18 in this order. The parallel line portions 16b1, 17b1, 18b1 are non-parallel to each other, and the parallel line portions of two single-layer structures adjacent to each other in the vertical direction intersect with each other. Further, in the present embodiment, the parallel line portions 16b1, 17b1, 18b1 are shifted by 60 degrees, and their pitches are the same, so that an equilateral-triangular void S is formed in the laminated structure 15 by the parallel line portions 16b1, 17b1, 18b1, as shown in the plan view of FIG. 3B. The larger the above-mentioned pitch ratio, the larger the void S, which improves the flexibility of the molded object.

(Second Viewpoint)

1. First Embodiment: Configuration of Laminated Structure 1

Figure 7:
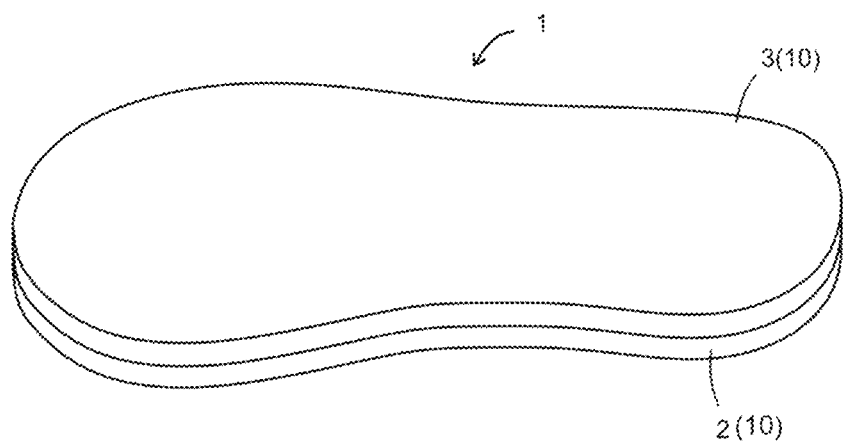
FIG. 7 is a perspective view schematically showing a laminated structure according to a first embodiment of the second viewpoint of the present invention.

In Section 1, the configuration of a laminated structure 1 according to an embodiment (a first embodiment) of the present invention will be described. As shown in FIG. 7, the laminated structure 1 includes a base material layer 2 and a coating layer 3. The laminated structure 1 can be applied in the nursing filed (supporters for pressure ulcer prevention, supporters for preventing talipes equinus, splints for children and the like) and to products used in sports (shoe insoles and the like). The laminated structure 1 is provided with the coating layer 3 made of a soft material to improve its usability. The laminated structure 1 is suitable for applications where the coating layer 3 is brought into contact with a living body (e.g., human body) during use. In the present embodiment, the laminated structure 1 is a shoe insole.

<Base Material Layer 2>

The base material layer 2 is the layer on which the coating layer 3 is formed, and the base material layer 2 and the coating layer 3 are in close contact with each other. The base material layer 2 is formed of a foamed body, and the foamed body of the base material layer 2 has cells into which the resin forming the coating layer 3 enters. The base material layer 2 can be formed of a foamed body having a large number of cells or may be formed of a sponge having a large number of cells. The resin material forming the base material layer 2 is not particularly limited. The cell structure of the base material layer 2 may be an open cell structure or a closed cell structure. While the resin is more likely to penetrate deeper into the open cell structure than the closed cell structure, the strength is easier to increase in the closed cell structure than the open cell structure.

<Coating Layer 3>

The coating layer 3 covers at least a part of the base material layer 2. The coating layer 3 is formed of a resin material different from the resin material forming the base material layer 2. The coating layer 3 is configured as a molded object 10 by laminating two types of linear structures (linear structures 4, 5 described later) as shown in FIG. 8A to FIG. 8C.

Figure 8A:
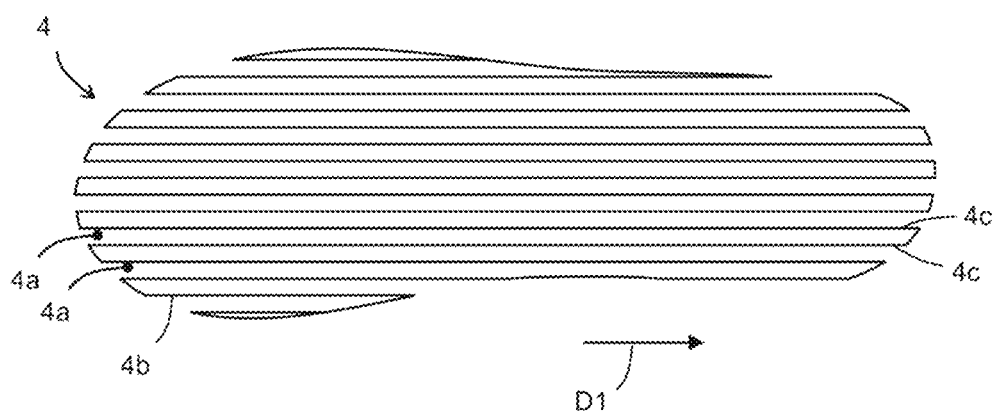
FIG. 8A and FIG. 8B are plan views schematically showing a linear structure formed by scanning linear resins in each extension direction.
Figure 8B:
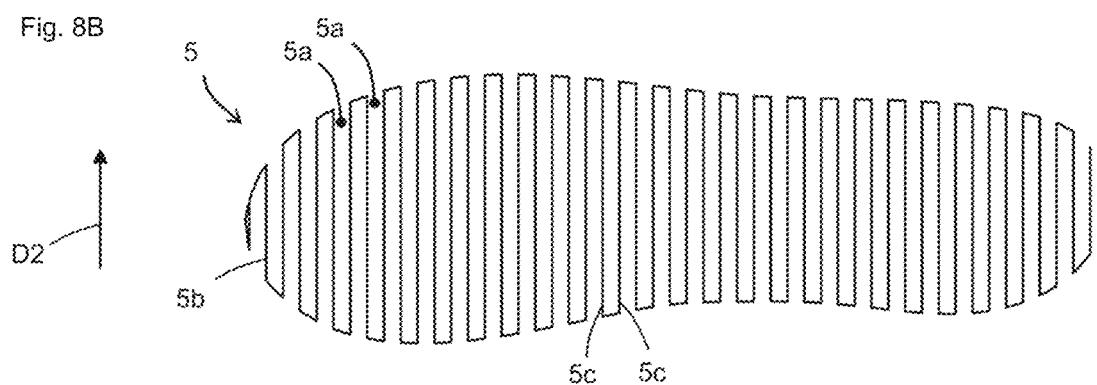
Figure 8C:
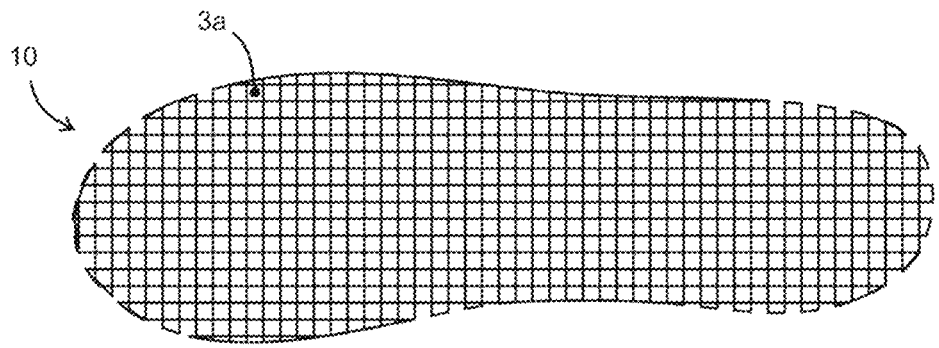
FIG. 8C is a plan view schematically showing a molded object formed by alternately laminating the linear structures shown in FIG. 8A and FIG. 8B.

As shown in FIG. 8A and FIG. 8B, the linear structures 4, 5 are each formed by one linear resin 4b, 5b. As shown in FIG. 8A, the linear resin 4b constituting the linear structure 4 extends in a first direction D1, and as shown in FIG. 8B, the linear resin 5b constituting the linear structure 5 extends in a second direction D2. Although the first direction D1 and the second direction D2 are orthogonal to each other in the present embodiment, the first direction D1 and the second direction D2 need not be orthogonal to each other. Further, a plurality of grooves 4a, 5a is formed in the linear structures 4, 5. The groove 4a extends in the first direction D1, and the groove 5a extends in the second direction D2. That is, there is a gap between a pair of adjacent straight portions 4c of the linear resin 4b, and similarly, there is a gap between a pair of adjacent straight portions 5c of the linear resin 5b. Such a gap will be described in more detail later.

Figure 9:
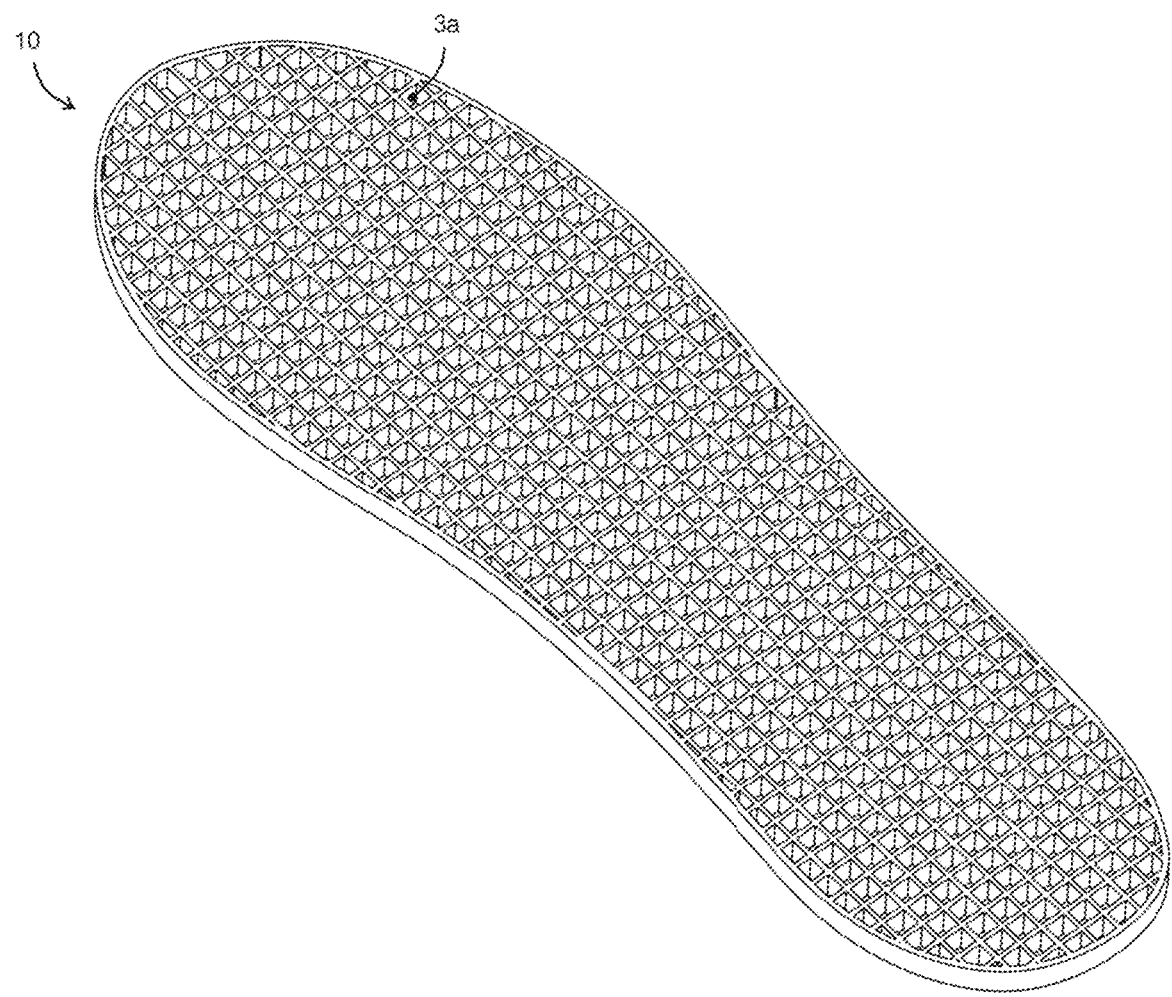
FIG. 9 is a perspective view of a molded object serving as a coating layer of the laminated structure of the first embodiment.

The molded object 10 includes a plurality of linear structures 4 and a plurality of linear structures 5, and the linear structure 4 and the linear structure 5 are laminated alternately. Consequently, as shown in FIG. 9, the molded object 10 is formed in a mesh shape, and a large number of holes 3a are formed in the molded object 10. Thus, the air permeability of the laminated structure 1 is improved, and the elasticity of the coating layer 3 of the laminated structure 1 is improved.

2. Structure Related to Flexibility of Laminated Structure 1

Figure 10A:
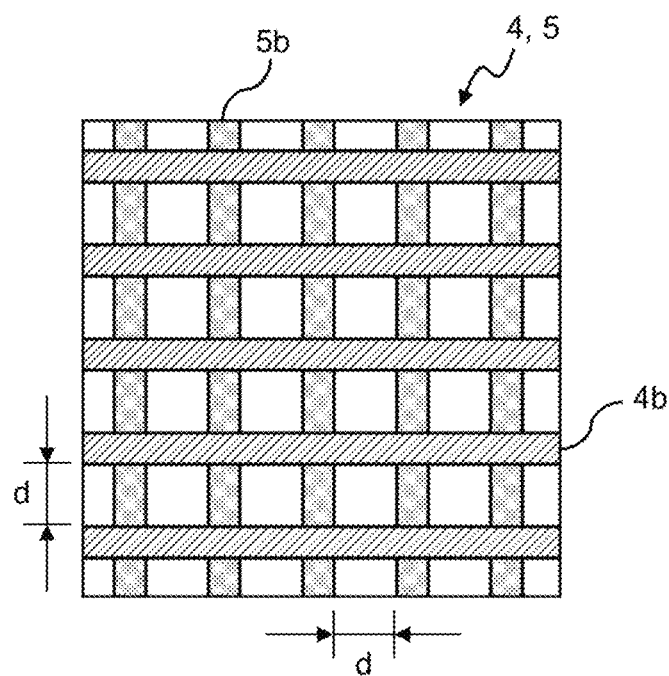
FIG. 10A is a plan schematic view of the laminated structure of the first embodiment.
Figure 10B:
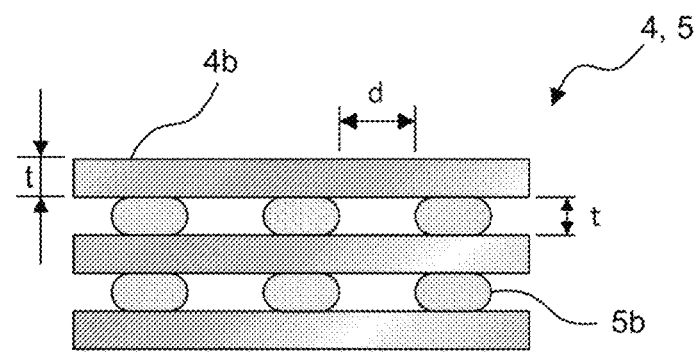
FIG. 10B is an end schematic view of the laminated structure.

In Section 2, the characteristic structure related to the flexibility of the laminated structure 1 will be described. As shown in FIG. 10B, even if the outlet shape of a nozzle NZ (see FIG. 12A and FIG. 12B) of a 3D printer (not shown) configured to discharge resin (for example, thermoplastic resin) is a perfect circle, the cross-sectional shape of the linear resins 4b, 5b after lamination is collapsed in a lamination direction under the influence of gravity and becomes a substantially elliptical shape. Here, the condition of d>t is satisfied where t represents the thickness, in the lamination direction, of the linear resins 4b, 5b having the elliptical cross section, and d represents the distance between the adjacent linear resins 4b, 5b in the same layer. With such a configuration, high flexibility can be ensured.

Meanwhile, the distance d between the linear resins 4b, 5b should not be extremely large to prevent cutting during operation in the manufacturing method described later, and for example, it is preferable to satisfy the condition of 1<d/t≤6. More specifically, for example, d/t may be 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, and may be within a range between any two of the values exemplified herein.

Figure 11A:
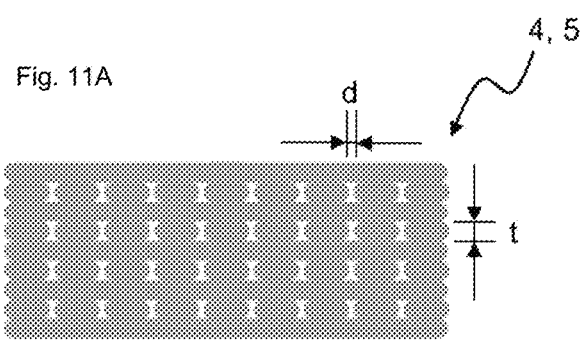
FIG. 11A and FIG. 11B are end schematic views when a load is applied in a state where the distance between the linear resins is narrow.
Figure 11C:
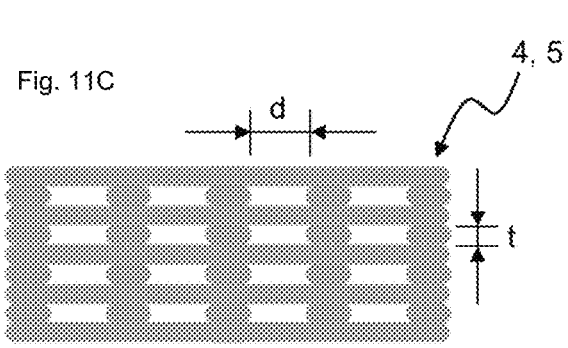
FIG. 11C and FIG. 11D are end schematic views when a load is applied in a state where the distance between the linear resins is wide.
Figure 11B:
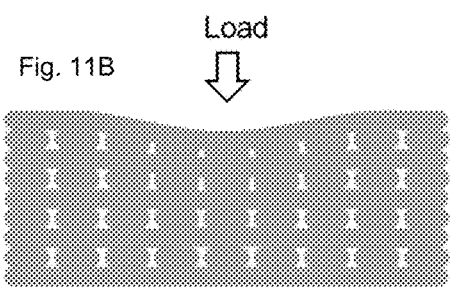
Figure 11D:
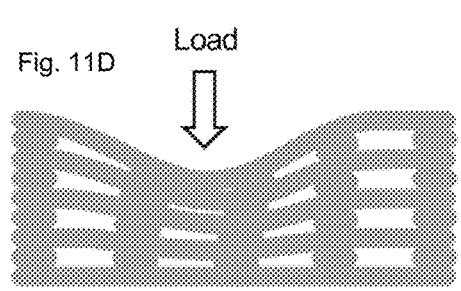

FIG. 11A, FIG. 11B, FIG. 11C, and FIG. 11D show the end face changes under load when the distance d between the linear resins 4b, 5b is smaller or larger than the thickness t of the linear resins 4b, 5b. FIG. 11A and FIG. 11B show the case where d≤t, and FIG. 11C and FIG. 11D show the case where d>t. In FIG. 11B, where the load is applied in a state of the small distance d between the linear resins 4b, 5b, the load is supported by the material of the linear resins 4b, 5b itself because the void is narrower than in FIG. 11D where d is large. Therefore, the elastic property of the laminated structure 1 is close to the elastic property of the material of the linear resins 4b, 5b. In contrast, in FIG. 11D where the condition of the distance d>the thickness t is satisfied, the void is wide, so that the amount of sinkage is large even under the same load, that is, high flexibility can be secured.

Even when the distance d between the linear resins 4b, 5b is large as described above, it is preferable that the material forming the linear resins 4b, 5b has higher flexibility, and the Shore A hardness is preferably 50 or less. The Shore A hardness is specifically, for example, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 and may be within a range between any two of the values exemplified herein. The chemical composition is not limited as long as the material can be handled by the 3D printer.

Further, when the distance d between the linear resins 4b, 5b is large, a large tensile force is locally applied to the linear resins due to deformation caused by the load. For this reason, the material forming the linear resins 4b, 5b preferably has a high elongation at break, for example, the elongation at break of 150% or more. The elongation at break is specifically, for example, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300% and may be within a range between any two of the values exemplified herein. The chemical composition is also not limited in terms of elongation at break.

3. Manufacturing Method of Laminated Structure 1

In Section 3, a manufacturing method of the laminated structure 1 according to the present embodiment will be described. The manufacturing method of the laminated structure 1 is not particularly limited, and the laminated structure 1 can be formed by a method, such as injection molding and 3D printer molding. In the case of injection molding, the base material layer 2 and the coating layer 3 can be integrally molded by two-color molding using shape memory material and soft material. Alternatively, one of the base material layer 2 and the coating layer 3 may be formed by injection molding, and the other may be formed on its top by 3D printer molding. Further, both the base material layer 2 and the coating layer 3 may be formed by 3D printer molding. It is preferable to form at least one of the base material layer 2 and the coating layer 3 by 3D printer molding because 3D printer molding allows the laminated structure 1 to be formed into a shape determined for each user.

In 3D printer molding, the molded object 10 can be formed by two-dimensionally scanning, with a nozzle NZ (see FIG. 12A and FIG. 12B), a linear resin formed by extruding molten resin from a head, as shown in FIG. 8A and FIG. 8B, to form the linear structures 4, 5 and laminating the linear structures 4, 5. The resin may be supplied to the head in the form of filaments or in the form of pellets. In the latter case, even soft materials that are difficult to shape into filaments can be used to form the linear resins 4b, 5b.

The linear structures 4, 5 are formed by two-dimensionally scanning the linear resins 4b, 5b in a single stroke. The linear structure 4 is a linear structure formed by scanning the linear resin 4b mainly in a transverse direction, and the linear structure 5 is a linear structure formed by two-dimensionally scanning the linear resin 5b mainly in a direction perpendicular to the transverse direction. The molded object 10 having a lattice shape in plan view can be obtained, as shown in FIG. 8C, by alternately laminating the linear structures 4, 5.

When the linear resins 4b, 5b are made of shape memory material, the base material layer 2 is obtained as the molded object 10. On the other hand, when the linear resins 4b, 5b are made of soft material, the coating layer 3 is obtained as the molded object 10.

As shown in FIG. 8A to FIG. 8C, the linear structures 4, 5 each have a plurality of grooves 4a, 5a extending in parallel. The groove 4a is formed by extending, in parallel, the linear resin 4b forming the linear structure 4. The groove 5a is formed by extending, in parallel, the linear resin 5b forming the linear structure 5. Further, in two linear structures 4, 5 adjacent to each other in the lamination direction, the groove 4a of the linear structure 4 intersects with the groove 5a of the linear structure 5. Although the grooves 4a, 5a are orthogonal to each other in the present embodiment, the grooves 4a, 5a may be intersect with each other at an angle other than a right angle. The molded object 10 with such a structure is relatively lightweight because it has a space inside. Further, when the molded object 10 is the coating layer 3, the coating layer 3 can be easily deformed due to the space inside the coating layer 3, and the cushioning property of the coating layer 3 can be improved.

The physical property of the molded object 10 can be changed as appropriate by changing the two-dimensional shape of the linear structures 4, 5 or the diameter or density (number per unit area) of the linear resins 4b, 5b forming the linear structures 4, 5. For example, for the coating layer 3, the diameter of the linear resins 4b, 5b can be reduced, or the density of the linear resins 4b, 5b can be lowered to make the coating layer 3 more flexible. Further, although the density and pattern of the linear resins 4b, 5b are uniform throughout the linear structures 4, 5 in FIG. 8A to FIG. 8B, the density or pattern can be partially changed to change the physical property of the molded object 10. In this way, when the base material layer 2 and the coating layer 3 are formed by 3D printer molding, the physical property of the laminated structure 1 can be appropriately changed according to the needs of the user.

When both the base material layer 2 and the coating layer 3 are formed by 3D printer molding, the base material layer 2 may be formed first and the coating layer 3 may be formed using the base material layer 2 as a base, or the coating layer 3 may be formed first and the base material layer 2 may be formed using the coating layer 3 as a base. As shown in Examples described later, the former is preferable because it results in better adhesion between the base material layer 2 and the coating layer 3.

When the base material layer 2 is formed using the coating layer 3 as a base, the adhesion between the base material layer 2 and the coating layer 3 can be improved by increasing the temperature of the linear resins 4b, 5b when forming the base material layer 2. Meanwhile, since shape memory materials may easily deteriorate at high temperature, the temperature of the linear resins 4b, 5b when forming the base material layer 2 needs to be kept as low as possible. Therefore, by setting the temperature of the linear resins 4b, 5b when forming a lowermost layer of the base material layer 2 higher than the average temperature of the linear resins 4b, 5b when forming the other layers of the base material layer 2, the deterioration of the shape memory material can be suppressed while improving the adhesion.

In particular, in the laminated structure 1 of the present embodiment, the distance d between the linear resins 4b, 5b adjacent to each other in the same layer is larger than the thickness t of the linear resins 4b, 5b, and it is necessary to construct a long bridge portion BR. In such a case, if the amount of resin discharged from the nozzle NZ is set at a constant level in the material extrusion deposition method in which resin softened at high temperature is discharged from the nozzle NZ, the lamination can be performed without problems at a place where a linear resin 4b, 5b exists in the layer immediately below. In contrast, the bridge portion BR is loosened, and sagging occurs at a place where the linear resin 4b, 5b does not exist in the layer immediately below and there is a void, because there is no support for the softened resin discharged from the nozzle NZ.

Figure 12A:
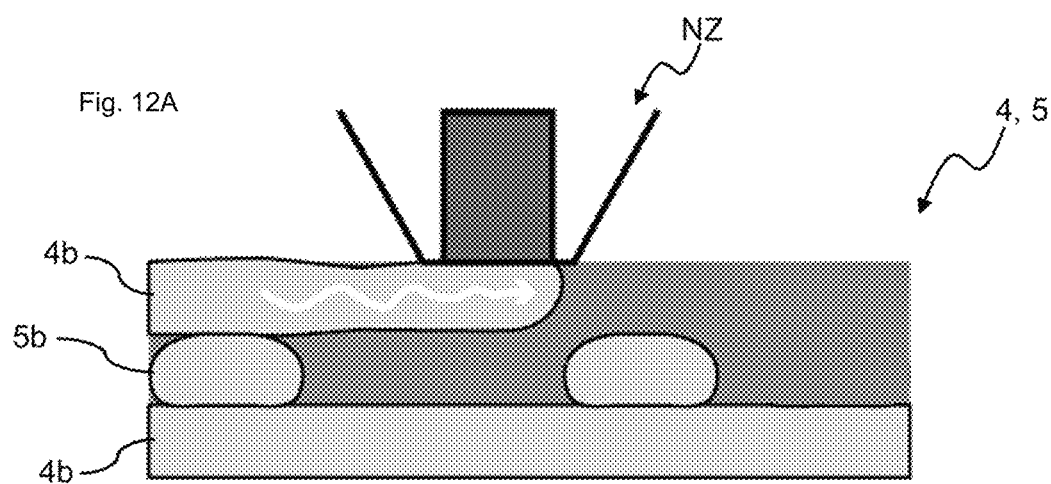
FIG. 12A and FIG. 12B are diagrams illustrating a manufacturing method in which a discharge amount from a nozzle is adjusted.
Figure 12B:
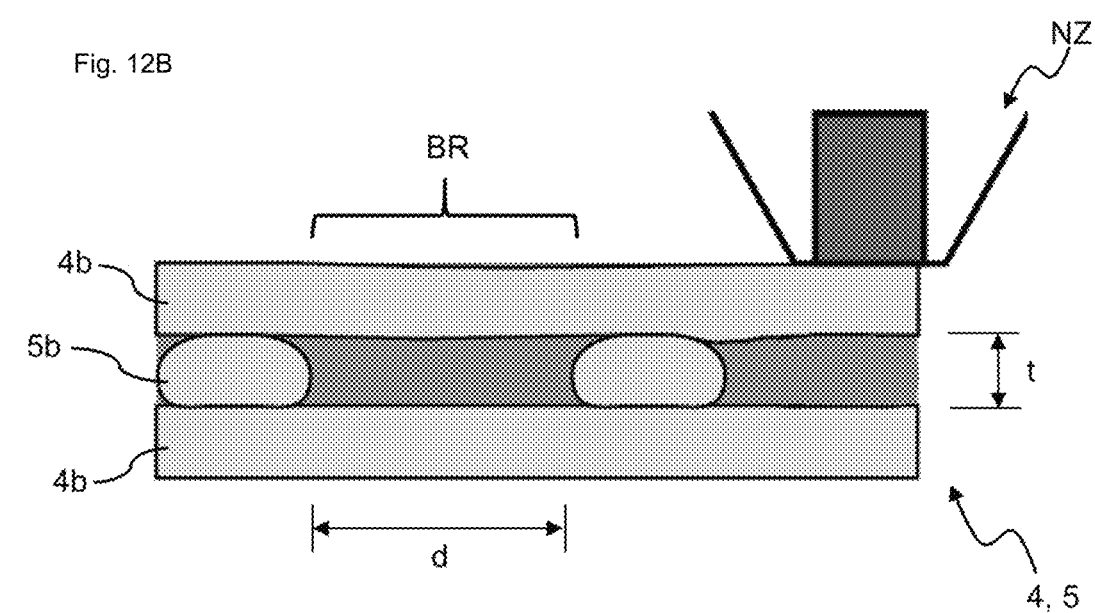

In order to deal with the above problem, the amount of the linear resins 4b, 5b discharged from the nozzle NZ can be adjusted less at a place where the linear resin 4b, 5b does not exist in the layer immediately below and there is a void, so that the bridge portion BR can be prevented from being loosened and the long bridge portion BR can be constructed. FIG. 12A and FIG. 12B show this manufacturing method.

FIG. 12A shows a state during the discharge of the linear resin 4b forming the bridge portion BR at a place where the linear resin 5b does not exist in the layer immediately below. The nozzle NZ is moved in the first direction D1 while discharging the resin to form the linear resin 4b. The discharge amount at a place where there is a void with no linear resin 5b in the layer immediately below is reduced compared to the discharge amount at a place where the linear resin 5b exists in the layer immediately below, and the horizontal movement of the nozzle NZ is performed while stretching the resin to prevent sagging.

FIG. 12B shows a state when the discharge of the linear resin 4b forming the target bridge portion BR is completed. The bridge portion BR is formed in a straight line without loosening.

In other words, in a molding step where the resin is discharged from the nozzle NZ while moving the nozzle NZ, the amount of resin discharged at a place where there is a void in the layer immediately below is reduced compared to the amount of resin discharged at a place where the linear resin 4b, 5b exists in the layer immediately below.

4. Second Embodiment

Figure 13A:
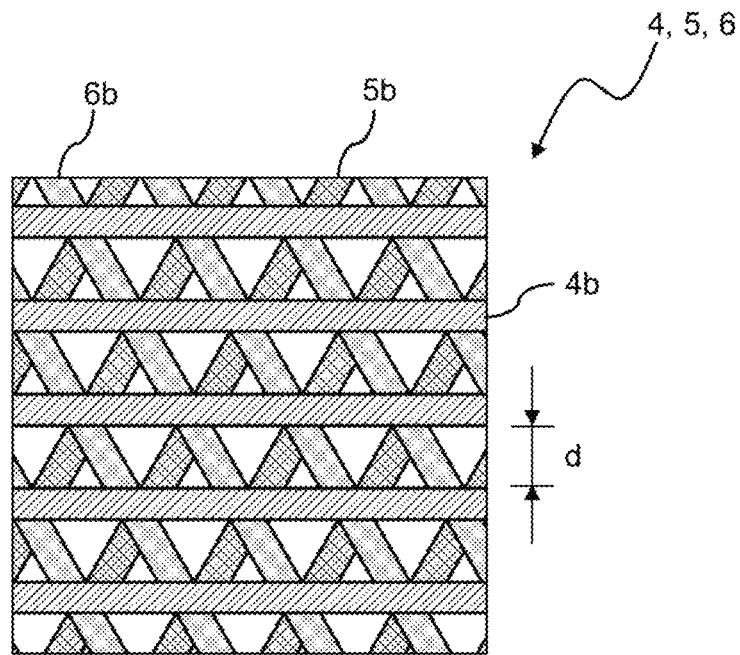
FIG. 13A is a plan schematic view of a laminated structure according to a second embodiment of the second viewpoint of the present invention.
Figure 13B:
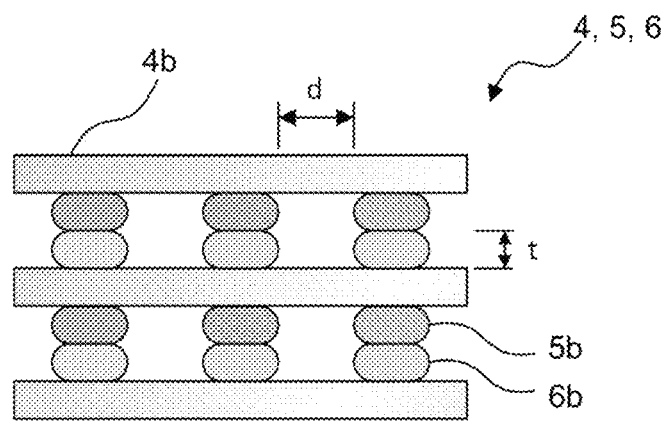
FIG. 13B is an end schematic view of the laminated structure.

In Section 4, a second embodiment will be described. In the first embodiment, the laminated structure 1 (the linear structures 4, 5) in which the linear resins 4b, 5b extend in two directions of the transverse direction and the direction perpendicular to the transverse direction alternately every layer was described. In the second embodiment, the laminated structure 1 (the linear structures 4, 5, 6) in which the linear resins 4b, 5b, 6b extend in three directions alternately every layer will be described. The laminated structure 1 in such a case is shown in FIG. 13A and FIG. 13B. FIG. 13A is a plan schematic view, and FIG. 13B is an end schematic view. In FIG. 13A and FIG. 13B, the linear resins 4b, 5b, 6b are shifted by 60 degrees for each adjacent layer, with the linear resin 4b arranged in the transverse direction in FIG. 13A, the linear resin 5b rotated 60 degrees counterclockwise, and the linear resin 6b rotated 120 degrees counterclockwise. Further, as is clear from FIG. 13B, the extension directions of the linear resins 4b, 5b, 6b in the k-th and (k+3)-th layers are the same for the k-th layer that does not exceed the lamination direction, i.e., satisfies a condition of 1≤k≤n−3 where n represents the total number of layers of the laminated structure 1. In this regard, although the position of the linear resins 4b, 5b, 6b relative to a direction perpendicular to the extension direction within the layer is the same for the k-th and (k+3)-th layer in FIG. 13A and FIG. 13B, the configuration is not limited thereto.

In addition, although an angle between the extension directions of the linear resins 4b, 5b, 6b is 60 degrees to form an equilateral triangular, the angle between the extension directions of the linear resins 4b, 5b, 6b forming each layer is not limited to 60 degrees. Further, the number of extension directions of the linear resins 4b, 5b, 6b forming each layer is also not limited to three directions and may be four directions or more. As is clear from FIG. 13B, the height of the void, which is an interlayer distance between the layers of the linear resins 4b, 5b, 6b having the same extension direction, for example, the distance from a layer of the linear resin 5b to a layer of the linear resin 5b above or below that layer is theoretically (a−1)×t where a represents the number of extension directions of the linear resins 4b, 5b, 6b ... in each layer (a=3 in FIG. 13A and FIG. 13B). In this regard, it should be noted that the k-th layer, the (k+1)-th layer, ... . and the (k+a−1)-th layer do not coincide with each other in the extension directions.

Figure 14A:
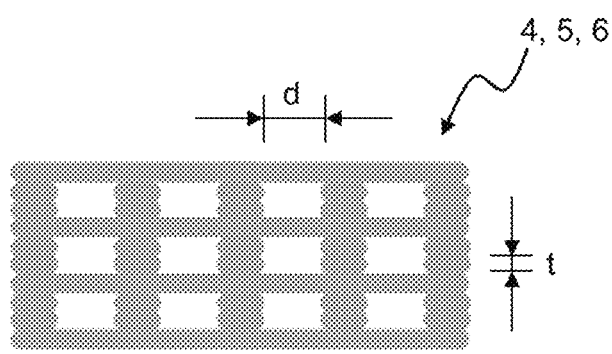
FIG. 14A and FIG. 14B are end schematic views when a load is applied in the second embodiment.
Figure 14B:
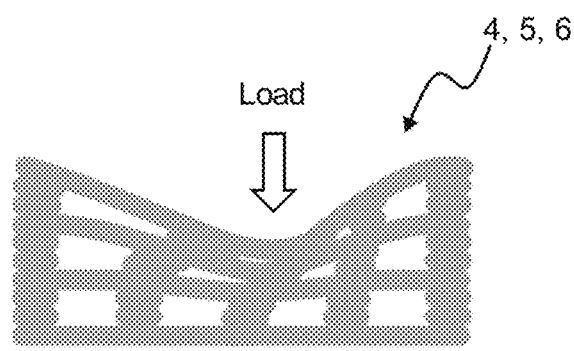

FIG. 14A and FIG. 14B shows end face changes when a load is applied to the laminated structure 1 with the linear resins 4b, 5b, 6b extending in three directions. The height of the void is as high as 2t, compared to the afore-mentioned configuration in which the linear resins 4b, 5b extend in two directions (FIG. 8A, FIG. 8B, and FIG. 8C), and thus this configuration allows for greater deformation. That is, the laminated structure 1 in this case has higher flexibility.

In this regard, it should be noted that the interlayer distance between the k-th layer and the (k+a)-th layer in consideration of sagging is larger than t and preferably larger than αt (α is a coefficient). Here, α satisfies a condition of α≥1, preferably, α≥1.2, more preferably, α≥1.5. α is specifically, for example, α=1, 1.1, 1.2, 1.3, 1.4, 1.5, 1.6, 1.7, 1.8, 1.9, 2, 2.1, 2.2, 2.3, 2.4, 2.5 and may be within a range between any two of the values exemplified herein.

5. Conclusion

As described above, according to the present embodiment, a more flexible laminated structure 1 can be realized for the three-dimensional laminated structure made of resin.

The laminated structure 1 is formed by laminating a plurality of layers, and each of the layers comprises the linear resins 4b, 5b ... arranged in parallel. A condition of d>t is satisfied where d represents the distance between two adjacent linear resins 4b, 5b . . . in the same layer, and t represents the thickness of the linear resins 4b, 5b . . . in the lamination direction.

Alternatively, the laminated structure 1 is formed by laminating n layers, and each of the layers comprises the linear resins 4b, 5b . . . arranged in parallel. Each of the layers is laminated so that extension directions of the linear resins 4b, 5b . . . of the k-th layer and the (k+a)-th layer coincide with each other where natural numbers k and a satisfy conditions of 1≤k<k+a≤n and a≥3.

Further, a manufacturing method of the more flexible laminated structure 1 can be realized for a three-dimensional laminated structure made of resin.

The manufacturing method is a manufacturing method of the laminated structure 1 formed by laminating a plurality of layers. The method includes a molding step, and in the molding step, resin is discharged from the nozzle NZ while moving the nozzle NZ to form the layers with a plurality of linear resins 4b, 5b . . . each arranged in parallel. Here, a condition of d>t is satisfied where d represents the distance between two adjacent linear resins 4b, 5b . . . in the same layer, and t represents the thickness of the linear resin in the lamination direction.

Alternatively, the manufacturing method is a manufacturing method of the laminated structure 1 formed by laminating a plurality of layers. The method includes a molding step, and in the molding step, resin is discharged from the nozzle NZ while moving the nozzle NZ to form the layers with a plurality of linear resins 4b, 5b . . . each arranged in parallel. Here, the laminated structure 1 is formed by laminating each of the layers so that extension directions of the linear resins 4b, 5b . . . of the k-th layer and the (k+a)-th layer coincide with each other where natural numbers k and a satisfy conditions of 1≤k<k+a≤n and a≥3.

Although various embodiment according to the present invention has been described, these are presented as examples and are not intended to limit the scope of the invention. The novel embodiments can be implemented in various other forms, and various omissions, replacements, and changes can be made without departing from the spirit of the invention. The embodiments and the modifications thereof are included in the scope and gist of the invention and are included in the invention described in the claims and the equivalents thereof.

EXAMPLES (Examples of First Viewpoint)

The MFR of granular materials formed of thermoplastic elastomers shown in Table 1 was measured at the temperature shown in Table 1. Further, using these granular materials as material, molded objects formed of the laminated structure 15 shown in FIG. 3A and FIG. 3B were produced at the temperature shown in Table 1 by a three-dimensional printer including an extruder with a screw. The temperature shown in Table 1 is the temperature of the strand 14 immediately after extruded from the nozzle 12c and was measured using a thermography (infrared thermography camera, Thermo GEAR, model: G120EX, manufactured by Nippon Avionics). The diameter of the strand 14 was set to 2 mm, the moving speed of the nozzle 12c was set to 50 mm/s, and the pitch of the parallel line portions was set to 6.5 mm. The line width of the parallel line portion was 2.0 mm Therefore, the pitch ratio was 3.25.

The obtained molded objects were visually observed and evaluated for moldability according to the following criteria.

A: No collapse was observed in molding.

B: Slight collapse (for example, peeling of a corner portion of the molded object) was observed in molding.

C: Strand breakage or failure of the strand to adhere to the molding head occurred, or significant collapse was observed in molding.

As shown in Table 1, the moldability was excellent when the MFR at the molding temperature was 10 to 200 g/10 min, and the moldability was particularly excellent when the MFR was 60 to 140 g/10 min.

TABLE 1

| Thermo-plastic Elastomer | Shore A Hardness | Test No. | Temperature (° C.) | MFR (2.16 kg) | Moldability Evaluation |
|---|---|---|---|---|---|
| CJ103 | 15 | 1 | 170 | 0.05 | C |
|  |  | 2 | 190 | 0.09 | C |
|  |  | 3 | 210 | 0.16 | C |
|  |  | 4 | 230 | 0.57 | C |
| JS20N | 1 | 5 | 170 | 3.53 | C |
|  |  | 6 | 190 | 18.46 | B |
|  |  | 7 | 210 | 79.44 | A |
|  |  | 8 | 220 | 165.32 | B |
|  |  | 9 | 230 | 281.45 | C |
| AR-SC-0 | 0 | 10 | 110 | 3.03 | C |
|  |  | 11 | 120 | 6.20 | C |
|  |  | 12 | 130 | 22.60 | B |
|  |  | 13 | 150 | 127.52 | A |
|  |  | 14 | 155 | 192.34 | B |
|  |  | 15 | 160 | 295.62 | C |
|  |  | 16 | 170 | 540.94 | C |
| AR-SC-5 | 3 | 17 | 130 | 1.50 | C |
|  |  | 18 | 150 | 8.67 | C |
|  |  | 19 | 170 | 41.27 | B |
|  |  | 20 | 190 | 132.54 | A |
|  |  | 21 | 195 | 174.00 | B |
|  |  | 22 | 200 | 240.17 | C |
|  |  | 23 | 210 | 393.94 | C |
| AR-815C | 13 | 24 | 150 | 0.38 | C |
|  |  | 25 | 170 | 0.47 | C |
|  |  | 26 | 190 | 0.13 | C |
|  |  | 27 | 230 | 0.12 | C |

The details of the thermoplastic elastomers in Table are as follows.
CJ103: EARNESTON, manufactured by Kuraray Co. Ltd.
JS20N: EARNESTON, manufactured by Kuraray Co. Ltd.
AR-SC-0: manufactured by Aronkasei Co. Ltd.
AR-SC-5: manufactured by Aronkasei Co. Ltd.
AR-815C: manufactured by Aronkasei Co. Ltd.

REFERENCE SIGNS LIST

1: laminated structure, 2: base material layer, 3: coating layer, 3a: hole, 4: linear structure, 4a: groove, 4b: linear resin, 4c: straight portion, 5: linear structure, 5a: groove, 5b: linear resin, 5c: straight portion, 6b: linear resin, 10: molded object, 11: granular material for fused deposition three-dimensional printer, 11a: circumscribed circle, 12: extruder with a screw, 12a: hopper, 12b: cylinder, 12c: nozzle, 14: strand, 15: laminated structure, 16: single-layer structure, 16a: outer circumferential line portion, 16b: inner line portion, 16b1: parallel line portion, 16b2: connecting line portion, 17: single-layer structure, 17a: outer circumferential line portion, 17b: inner line portion, 17b1: parallel line portion, 17b2: connecting line portion, 18: single-layer structure, 18a: outer circumferential line portion, 18b: inner line portion, 18b1: parallel line portion, 18b2: connecting line portion, BR: bridge portion, D1: first direction, D2: second direction, NZ: nozzle, P: pitch, S: void, W: line width, d: distance, t: thickness

The invention claimed is:

1. A manufacturing method of a molded object, comprising:
   a scanning step of scanning a strand formed by extruding, from a nozzle, a granular material formed of a thermoplastic elastomer melted in an extruder with a screw, wherein the thermoplastic elastomer has a Shore A hardness of 0 to 10 and a melt flow rate of 60 to 140 g/10 min at a molding temperature that is a temperature of the strand immediately after being extruded from the nozzle, the molding temperature being a temperature between 120° C. to 230° C.

2. The method of claim 1, wherein a laminated structure is formed by laminating single-layer structures formed by performing the scanning step, the single-layer structures each comprise a plurality of parallel line portions spaced apart from each other, and two single-layer structures adjacent to each other in a vertical direction are provided so that pluralities of parallel line portions of the two single-layer structures intersect with each other.

3. The method of claim 2, wherein a pitch ratio defined as a ratio of a pitch of the parallel line portions to a line width of the parallel line portions is 1.5 to 6.

\* \* \* \* \*